(12) United States Patent
Denham

(10) Patent No.: US 8,779,342 B2
(45) Date of Patent: Jul. 15, 2014

(54) COMPACT DIGITAL PIXEL FOR A FOCAL PLANE ARRAY

(75) Inventor: Martin S. Denham, Bend, OR (US)

(73) Assignee: Raytheon Company, Waltham, MA (US)

( * ) Notice: Subject to any disclaimer, the term of this patent is extended or adjusted under 35 U.S.C. 154(b) by 404 days.

(21) Appl. No.: 13/194,418

(22) Filed: Jul. 29, 2011

(65) Prior Publication Data

US 2012/0280110 A1    Nov. 8, 2012

Related U.S. Application Data

(60) Provisional application No. 61/481,941, filed on May 3, 2011.

(51) Int. Cl.
*H01L 27/146* (2006.01)

(52) U.S. Cl.
USPC .................................... 250/208.1

(58) Field of Classification Search
USPC ............... 250/208.1; 348/308; 257/292
See application file for complete search history.

(56) References Cited

U.S. PATENT DOCUMENTS

| | | | |
|---|---|---|---|
| 5,461,425 A | | 10/1995 | Fowler et al. |
| 7,030,356 B2 * | | 4/2006 | Pain et al. ................ 250/208.1 |
| 7,417,230 B2 * | | 8/2008 | Anderson et al. .......... 250/338.1 |
| 7,463,278 B2 | | 12/2008 | Ozasa et al. |
| 7,488,926 B2 * | | 2/2009 | Knee et al. ................ 250/208.1 |
| 7,505,022 B2 | | 3/2009 | Matsuda et al. |
| 7,895,492 B2 | | 2/2011 | Hiraide et al. |
| 7,920,171 B2 * | | 4/2011 | Hu ............................ 348/222.1 |
| 7,940,317 B2 | | 5/2011 | Baxter |
| 2003/0058360 A1 | | 3/2003 | Liu et al. |
| 2007/0158533 A1 | | 7/2007 | Bamji et al. |
| 2009/0002535 A1 | | 1/2009 | Park et al. |
| 2009/0244346 A1 | | 10/2009 | Funaki |
| 2010/0181464 A1 | | 7/2010 | Veeder |
| 2010/0194956 A1 | | 8/2010 | Yuan et al. |

FOREIGN PATENT DOCUMENTS

| | | |
|---|---|---|
| EP | 1858245 A1 | 11/2007 |
| WO | 2006113414 A2 | 12/2007 |

OTHER PUBLICATIONS

Fischer, Peter et al. "Multi-Channel Readout ASIC for ToF-PET", Nuclear Science Sumposium Conference Record, IEEE, 2006.

\* cited by examiner

*Primary Examiner* — Seung C Sohn
(74) *Attorney, Agent, or Firm* — Lando & Anastasi, LLP

(57) ABSTRACT

According to one embodiment of the present disclosure, a focal plane array is provided. The focal plane array may comprise a plurality of pixels. Each pixel may include one or more capacitors operable to collect charge corresponding to an amount of light received at the respective pixel. Each pixel may further include a present state register operable to store a present state value of the respective pixel. The present state value indicates an amount of charge collected by the one or more capacitors of the respective pixel. The focal plane array may further include a logic circuit coupled to each present state register of the plurality of pixels. The logic circuit is operable to compute a next state value of each pixel based on the present state value of the respective pixel. The logic circuit may be time shared by the pixels.

18 Claims, 3 Drawing Sheets

COMPACT DIGITAL PIXEL FOR A FOCAL PLANE ARRAY

RELATED APPLICATION

This application claims benefit under 35 U.S.C. §119(e) of U.S. Provisional Application Ser. No. 61/481,941, entitled "COMPACT DIGITAL PIXEL FOR A FOCAL PLANE ARRAY," filed May 3, 2011, which is herein incorporated by reference.

TECHNICAL FIELD

The present disclosure relates generally to an array element and more specifically to a compact digital pixel of a focal plane array.

BACKGROUND

A focal plane array may comprise a plurality of pixels used to create an image. Each pixel may include a photo-detector for converting light to electrical charge. This charge may be stored in a well capacitor. The well capacitor may be reset (i.e., the charge of the capacitor may be completely dissipated or dissipated by a predetermined amount) each time its charge exceeds a threshold value. The number of times that a capacitor is reset corresponds to the amount of light received by the pixel. An image may be constructed according to the amount of light received by each pixel of the focal plane array.

SUMMARY OF THE DISCLOSURE

According to one embodiment of the present disclosure, a focal plane array is provided. The focal plane array may comprise a plurality of pixels. Each pixel may include one or more capacitors operable to collect charge corresponding to an amount of light received at the respective pixel. Each pixel may further include a present state register operable to store a present state value of the respective pixel. The present state value indicates an amount of charge collected by the one or more capacitors of the respective pixel. The focal plane array also includes a logic circuit coupled to each present state register of the plurality of pixels. The logic circuit is operable to compute a next state value of each pixel based on the present state value of the respective pixel.

Certain embodiments of the disclosure may provide one or more technical advantages. A technical advantage of one embodiment may be that a plurality of pixels may time share a logic circuit that is operable to compute a next state of each pixel. Another technical advantage of one embodiment may be that a next state logic circuit for computing a next state of each of a plurality of pixels may be physically distributed among the pixels.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1A:
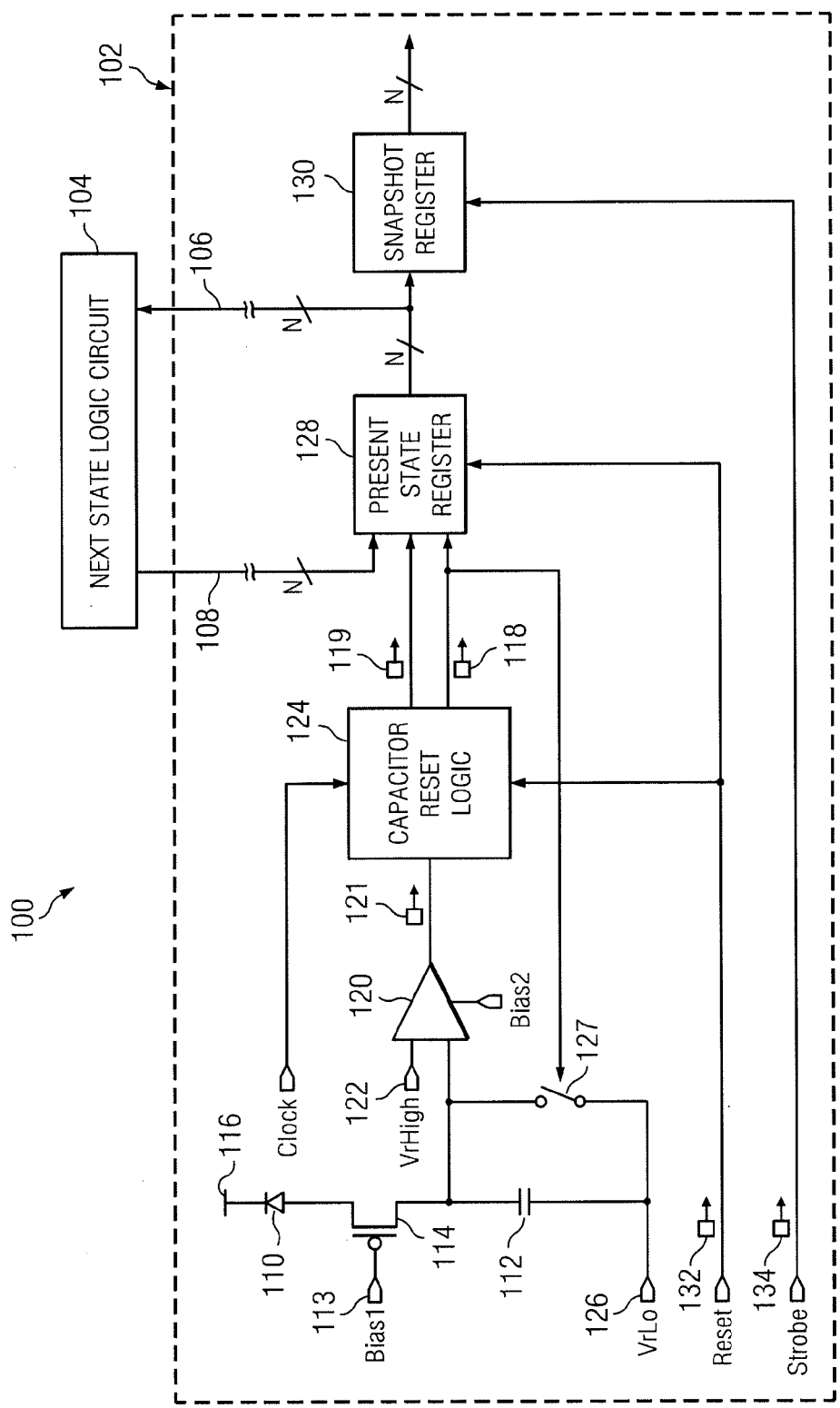
FIG. 1A depicts an example system comprising a compact digital pixel of a focal plane array (FPA)

FIG. 1A depicts an example system 100 comprising a compact digital pixel 102 of a focal plane array (FPA). An FPA may comprise a plurality of pixels 102. Each pixel may include one or more well capacitors 112 operable to collect charge corresponding to an amount of light received at the respective pixel 102. Each pixel may further include a present state register 128 operable to store a present state value of the respective pixel 102. The present state value indicates an amount of charge collected by the one or more well capacitors 112 of the respective pixel 102. The FPA may further include a logic circuit 104 coupled to each present state register 128 of the plurality of pixels. The logic circuit 104 is operable to compute a next state value of each pixel 102 based on the present state value of the respective pixel.

In general, an FPA may comprise a plurality of pixels used to create an image. A pixel is an area of an FPA that includes circuitry for detecting an amount of light received. Each pixel of the FPA may include a photo-detector (such as a photo-diode) for converting light to electrical charge. This charge may be stored in a well capacitor. The well capacitor is generally included within the pixel along with the photo-diode. However, the pixel size of a read out integrated circuit (ROIC) FPA is generally constrained by the pitch of the photo-diodes of the FPA and is relatively small. For example, if the photo-diodes of a Long-Wave Infrared (LWIR) FPA are on a 30 micrometer pitch, then the pixel size is generally no larger than 30 micrometers per side. Because of these size constraints, a well capacitor that fits within a pixel may not be large enough to hold all of the photo-current generated by the photo-diode of the pixel. Accordingly, a pixel may reset its well capacitor (i.e., dissipate the charge of the well capacitor completely or by a predetermined amount) when its collected charge exceeds a threshold value so that the well capacitor can continue to collect charge. The number of times that a well capacitor is reset over a time interval (such as a frame) corresponds to the amount of light received by the pixel. This number may be tracked by a counter that increments each time the well capacitor is reset.

The circuit that detects the threshold crossing of the well capacitor and counts the number of times that the well capacitor has been reset may be included in the pixel along with the photo-diode and capacitor. This implementation of the logic is called an "in-pixel analog to digital converter (ADC)" and the resulting pixel may be termed a "digital pixel." In typical digital pixels, each pixel includes its own counter to track the number of times its well capacitor has filled up to a threshold with charge. As pixel dimensions shrink, the amount of area within a pixel for circuitry supporting in-pixel ADC is reduced.

Certain embodiments of the disclosure include a compact digital pixel 102 in which several pixels share a next state logic circuit 104 (e.g., a binary increment circuit). Each pixel may have a register 128 that holds the current number of times that the well capacitor 112 of the pixel 102 has been reset. When the pixel's well capacitor fills up to the threshold, the value stored in the pixel's present state register 128 may be sent to the next state logic circuit 104, which increments the value, and provides the incremented value to the pixel so that it may be saved in the pixel's register 128. In some embodiments, this next state logic circuit 104 may be physically distributed among the pixels that use it. By reducing the amount of circuitry included within each pixel 102, certain embodiments of the disclosure improve cost, performance, density, and/or power consumption of digital pixels for a given pixel size and process photo-lithography node. An FPA may comprise several sets of pixels 102, with each set of pixels having a shared next state logic circuit 104.

Certain embodiments of the present disclosure are described herein using a compact digital pixel of a focal plane array as an example. However, the methods and structures described herein may be applicable to any array with array elements that are spatially related (i.e., the array presents and/or stores information that is dependent on the location of each array element). For example, arrays used in image processing may present visual information that is dependent on the location of each array element (e.g., pixel). As another example, a sensor array may comprise a group of sensors that are located at spatially separated points. A compact digital pixel is simply one embodiment of an array element and the functionality, structure, and/or other characteristics described herein with respect to a digital pixel may also be applicable to other types of array elements.

Referring to FIG. 1A, system 100 comprises a next state logic circuit 104 coupled to a digital pixel 102 through connections 106 and 108. Digital pixel 102 comprises a photo-diode 110 coupled to a voltage source 116 and a direct injection gate 114. Direct injection gate may be biased using bias 113. Digital pixel 012 also includes a well capacitor 112 operable to receive charge from photo-diode 110 through direct injection gate 114. In other embodiments, photo-diode 110 may be coupled to well capacitor 112 using other suitable means. Other embodiments may use other photo-diode schemes and/or other detection devices to generate and store charge indicative of detected light.

In some embodiments, the well capacitor 112 may be reset to a reference voltage 126 by application of a capacitor reset signal 118 to switch 127. In other embodiments, application of the capacitor reset signal 118 to switch 127 results in reducing the charge in well capacitor 112 by a predetermined amount. Well capacitor 112 is also coupled to comparator 120 which is operable to generate a signal 121 when the voltage across well capacitor 112 crosses (e.g., exceeds) a reference voltage 122. In some embodiments, capacitor 112 is operable to continuously compare the voltage across well capacitor 112 to a reference voltage. In other embodiments, capacitor 112 only performs the comparison upon receiving a periodic strobe in order to optimize power usage. Capacitor reset logic 124 is operable to generate the capacitor reset signal 118 in response to detecting the signal 121. Capacitor reset logic 124 is also operable to generate a signal 119 that indicates that a next state value on connection 108 should be saved in the present state register 128. The present state register 128 is operable to store a present state value of digital pixel 102 that is indicative of an amount of light received at pixel 102. The present state register provides the present state value to next state logic circuit 104 on connection 106 and receive a next state value from the next state logic circuit on connection 108. Snapshot register 130 is operable to receive the present state value from the present state register and capture the present state value when a strobe signal 134 is received. Reset signal 132 may reset the capacitor reset logic 124 and present state register 128 to an initial state.

Figure 1B:
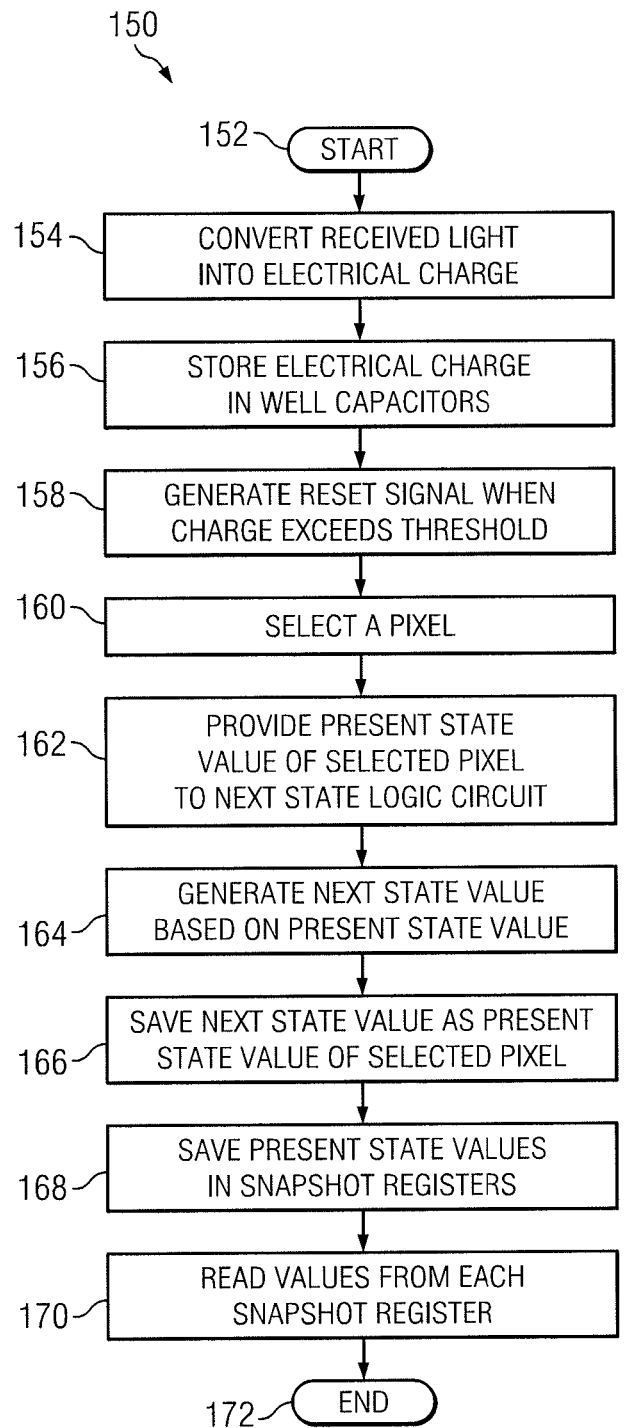
FIG. 1B depicts an example method that one or more compact digital pixels may perform.

The operation of system 100 is described in reference to method 150 of FIG. 1B. The steps of method 150 may be performed by one or more pixels 102 of an FPA.

The method begins at step 152. At step 154, pixel 102 receives light and converts the light into electrical charge. For example, pixel 102 comprises photo-diode 110 operable to convert the light it receives into photo-current. Direct injection gate 114 may bias photo-diode 110 such that a quantity of current may flow from voltage source 116 to well capacitor 112 according to the amount of light received by photo-diode 110. Direct injection gate 114 may include any suitable biasing mechanism, such as a metal oxide semiconductor (MOS) transistor.

At step 156, the electrical charge that is generated is stored in well capacitor 112. The well capacitor may be any suitable size, such as one femto-farad (fF). In certain embodiments, the electrical charge is stored in a plurality of well capacitors. In various embodiments, the size and/or arrangement of the well capacitors 112 may be adjustable to optimize the operation of the pixel 102. Pixel 102 may be operable to convert one or more particular wavelengths of light to electrical charge. As an example, the pixel 102 may be operable to receive long-wave infrared (LWIR), mid-wave infrared (MWIR), and/or other wavelengths of light and generate photo-current from the received light. Some wavelengths of light may generate more photo-current than others. Thus, the size of the well capacitors may be adjusted according to the expected wavelength of light in order to optimize the operation of the pixel 102 (e.g., make the best use of the dynamic range of a binary increment circuit of next state logic circuit 104).

At step 158, a capacitor reset signal 118 is generated when the charge of well capacitor 112 exceeds a threshold value. Comparator 120 or other similar device is operable to detect whether the amount of charge held by well capacitor 112 exceeds a threshold value. For example, comparator 120 may compare the voltage across well capacitor 112 with a reference voltage 122 and generate a signal 121 when the well capacitor's voltage crosses (e.g., exceeds) the reference voltage. Such an event may indicate that the well capacitor 112 is at a target voltage. Capacitor reset logic 124 is operable to generate an appropriate capacitor reset signal 118 in response to detecting signal 121. Capacitor reset signal 118 may be used to reset well capacitor 112 to a reference voltage 126. For example, capacitor reset signal 118 may be used to close switch 127, allowing charge stored in well capacitor 112 to dissipate. Capacitor reset signal 118 may be any suitable signal, such as a digital pulse.

The number of capacitor reset signals 118 generated may be tracked (e.g., counted) in order to determine an amount of charge collected by well capacitor 112 during a time period, such as a frame. If the photo-current generated by photo-diode 110 is relatively high (representing a brighter portion of a scene), then more capacitor reset signals 118 will be generated. Conversely, if the photo-current is relatively low (representing a darker portion of a scene), less capacitor reset signals 118 will be generated.

At step 160, pixel 102 is selected from among a plurality of pixels that share next state logic circuit 104. A selection circuit (described in more detail below) may be operable to select each pixel of the plurality of pixels in a rotary fashion. For example, a particular pixel 102 may be selected for a period of time, then another pixel may be selected for another period of time, and so on. The selection circuit may periodically select each pixel 102 such that the charge collected by the well capacitor 112 may be accurately measured. For example, a particular pixel 102 may be selected at an interval that ensures that the well capacitor will not exceed a maximum range which would cause image distortion. In some embodiments, only one pixel of the plurality of pixels is selected at any given time. In various embodiments, capacitor reset logic 124 may generate reset signal 118 when pixel 102 is selected and has received a new instance of signal 121 since the pixel 102 was last selected.

At step 162, the selected pixel 102 provides its present state value to next state logic circuit 104. The present state value of the pixel 102 is a value that indicates the amount of charge collected by the well capacitor 112 of the selected pixel. For example, the present state value may correspond to the number of times that well capacitor 112 has been reset over a given time period. Upon receiving reset signal 118 (or a similar signal), present state register 128 provides the present state value of pixel 102 to next state logic circuit 104 via connection 106. As described below, in some embodiments, various pixels may share connection 106 in order to provide their respective present state values to next state logic circuit 104. In certain embodiments, if the next state value of a pixel 102 is not needed (e.g., no capacitor reset signal 118 has been received since the present state value was last updated), in order to save power, the present state register 128 does not provide its present state value to next state logic circuit 104.

In some embodiments, the present state value is stored as a series of bits in present state register 128. For example, present state register 128 may comprise an N-bit register that stores the present state value of pixel 102. Thus, as depicted, various connections (such as 106 and 108) may be operable to transmit N bits.

At step 164, the next state value of the selected pixel 102 is generated by next state logic circuit 104 based on the present state value of the pixel. Next state logic circuit 104 may comprise any suitable logic operable to receive a set of bits representing a present state of a register of pixel 102 and generate a set of bits representing a next state of the register. As an example, the next state logic circuit may increment or decrement the present state value stored in present state register 128 to generate the next state value of pixel 102. In some embodiments, next state logic circuit 104 may comprise a counter, such as a Gray code counter, a linear feedback shift register (LFSR), a binary counter, or other counting logic. In some embodiments, next state logic circuit 104 may be operable to count forward or backward.

After generating the next state value of the selected pixel 102, the next state logic circuit 104 provides this value to the present state register 128 via connection 108. At step 166, the present state register 128 saves the computed next state value as its present state value. In some embodiments, pixel 102 may share connection 108 with other pixels. In some embodiments, present state register 128 may receive a signal 119 that indicates that the current value on connection 108 should be saved as its present state value. In some embodiments, signal 119 may be generated in response to the deactivation of the selection signal (from the selection circuit) that selected pixel 102.

At step 168, the present state value stored in present state register 128 may be saved in snapshot register 130. For example, when a snapshot event occurs at the end of a frame period, the contents of the present state register 128 may be copied into the snapshot register 130. The snapshot event may occur at any suitable time and generally occurs once per frame. In conjunction with the snapshot event, a reset signal 132 may be sent to reset the capacitor reset logic 124 and/or present state register 128. In other embodiments, no reset signal is sent to present state register 128 and the difference between successive snapshot register values indicates the amount of light received by the pixel 102 during the relevant time period. In particular embodiments, reset signal 132 may be sent to next state logic circuit 104 instead of present state register 128. Reset signal 132 may reset the next state logic circuit 104 to an initial value. The initial value may then be loaded into the present state registers 128 of each pixel coupled to the next state logic circuit 104 via connection 108. This embodiment may result in simpler routing and reduce the amount of logic gates used. At step 170, the value of the snapshot register 130 of each pixel 102 is read out (e.g., line by line). The snapshot register 130 may be read while the pixel 102 continues to accumulate charge at well capacitor 112. The values read may be used to construct an image. The method ends at step 172.

Figure 2:
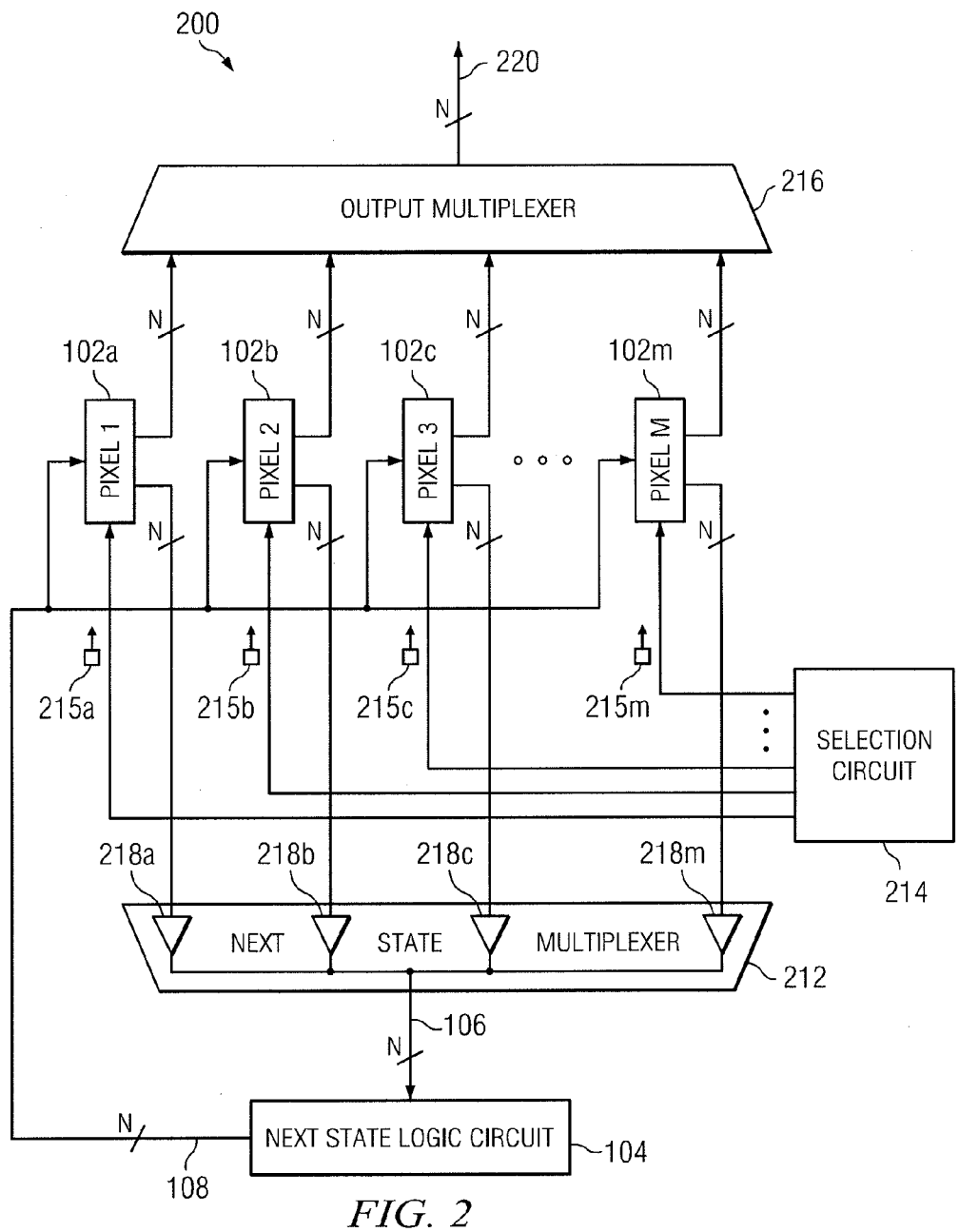
FIG. 2 depicts an example system comprising a plurality of pixels of an FPA.

FIG. 2 depicts an example system 200 comprising M pixels 102$a$-102$m$ of an FPA, next state logic circuit 104, next state multiplexer 212, and output multiplexer 216 coupled as shown. Each of pixels 102$a$-102$m$ may correspond to pixel 102 of FIG. 1 and next state logic circuit 104 is the same as that depicted in FIG. 1.

Each of the M pixels 102$a$-102$m$ may be operable to store an N-bit present state value. M and N may be any suitable values. In some embodiments M=N. In certain embodiments, M is 16, and the pixels are arrayed in 8 rows and 2 columns. In some embodiments, an FPA may include many sets of M pixels in which each set shares its own next state logic circuit 104 among the pixels of the respective set.

In system 200, the sharing of next state logic circuit 104 may be facilitated by next state multiplexer 212. Next state multiplexer 212 may enable time sharing of next state logic circuit 104 by pixels 102$a$-102$m$. Next state multiplexer 212 may include any suitable logic for asserting a set of N bits at its output 106 from an input comprising a plurality of sets of N bits. In certain embodiments, next state multiplexer 212 may comprise a plurality of tri-state gates 218$a$-218$m$, where each tri-state gate is coupled to the present state register 128 of one of the pixels 102$a$-102$m$. A tri-state gate 218 may comprise a plurality of tri-state drivers that are each coupled to a bit of the respective present state register 128. When a particular tri-state gate 218$a$ is enabled (i.e., each tri-state driver of the tri-state gate is enabled), the corresponding set of N bits (i.e., the output of present state register 128 of pixel 102$a$) is asserted at the output 106 of next state multiplexer 212. When a tri-state gate is not enabled, each of its tri-state drivers may present a high impedance state in order to allow a different tri-state gate to assert its set of N bits at the output of next state multiplexer 212. In other embodiments, different implementations of next state multiplexer 212 may be used.

In some embodiments, each pixel 102 coupled to next state logic circuit 104 through next state multiplexer 212 is selected in a rotary fashion by selection circuit 214. For example, pixel 102$a$ may be selected using selection signal 215$a$, then pixel 102$b$ may be selected using selection signal 215$b$, and so on. In some embodiments, only one pixel 102 coupled to next state logic circuit 104 is selected at a time. In other embodiments, selection signals 215$a$-215$m$ are timed such that only one of pixels 102$a$-102$m$ provides its present state value to next state logic circuit 104 at a time, regardless of whether two or more of selection signals 215$a$-215$m$ overlap.

As described above, next state logic circuit 104 may be operable to compute the next state value for the value asserted at the output 106 of next state multiplexer 212. In some embodiments, after the next state value is computed, it is made available to each pixel (in parallel) on connection 108. In other embodiments, each pixel could have a dedicated connection of N bits from next state logic circuit 104. The selected pixel 102 then loads the next state value on connection 108 into its present state register 128. As each of pixels 102$a$-102$m$ is selected, it may provide its present state value and then store the next state value calculated by next state logic circuit 104. Thus, the next state logic circuit 104 may be time shared by M pixels 102a-102m.

As discussed above, at the end of a period of time, each snapshot register 130 of pixels 102a-102m may copy the value of its respective present state register 128. In some embodiments, the copying of present state registers to snapshot registers may be spread out as a series of M events with temporal separation to reduce transient supply currents. In some embodiments, a snapshot register selection circuit is operable to select each snapshot register in succession. When a particular snapshot register is selected, the present state value stored in the corresponding present state register of the pixel is copied into the selected snapshot register.

After the copying is finished, each of the pixel snapshot registers 130 can be read out, one at a time, using the output multiplexer 216. In some embodiments, output multiplexer 216 may comprise a similar structure and/or operate in a similar fashion as described above with respect to next state multiplexer 212. For example, output multiplexer 216 may comprise a plurality of tri-state gates, where each tri-state gate is coupled to the snapshot register 130 of one of the pixels 102a-102m. In other embodiments, different implementations of output multiplexer 216 may be used. In some embodiments, pixels are read out through output multiplexer 216 one row at a time. In some embodiments, output line 220 may be shared over an entire column or sub-column. The values may be used to produce an image or other useful data.

Various layout techniques may result in effective use of the area of pixel 102. In some embodiments, the circuitry that makes up the next state logic circuit 104 may be physically distributed across one or more of the pixels 102a-102m that share the next state logic circuit. In certain embodiments, each pixel may comprise a portion of the next state logic circuit 104. For example, each pixel may include 1/Mth of the logic that comprises the next state logic circuit 104. In some embodiments, the next state logic circuit 104 may comprise a counter and each pixel 102 may include one or more bits of the counter. For example, each pixel 102 may comprise circuitry to store one or more bits of the counter. In other embodiments, the logic of next state logic circuit 104 is lumped together in a different physical arrangement.

Similarly, in some embodiments, next state multiplexer 212, output multiplexer 216, and/or selection circuit 214 may be distributed among pixels 102a-102m. For example, each pixel may comprise 1/Mth of the logic that comprises these circuits.

An FPA may have any suitable shape, such as rectangular. Each pixel 102 of the FPA may also have any suitable shape, such as rectangular. In some embodiments, the pixels 102a-102m are arranged in an array such that each pixel is contiguous with at least one other pixel. In certain embodiments, each pixel has dimensions that are the same or substantially similar to each other pixel. In some embodiments, the layout of two pixels 102a and 102b comprises a step-and-repeat cell that may be replicated to form another set of two pixels (such as 102c and 102d). In some embodiments, one or more bits of the next state logic circuit 104 may occupy a center region of a layout of two pixels. In some embodiments, two bits of the next state logic circuit 104 may comprise two complementary one-bit wide next-state circuits (e.g., adders) such that the number of inverters used may be decreased. In some embodiments, the layout of the present state register 128 and/or snapshot register 130 of a pixel may overlap one or more other pixels. Modifications, additions, or omissions may be made to the systems, apparatuses, and methods disclosed herein without departing from the scope of the invention. The components of the systems may be integrated or separated. Moreover, the operations of the systems may be performed by more, fewer, or other components. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A focal plane array comprising:
a plurality of pixels, each pixel comprising:
one or more capacitors operable to collect charge corresponding to an amount of light received at the respective pixel; and
a present state register operable to store a present state value of the representative pixel that indicates an amount of charge collected by the one or more capacitors of the respective pixel; and
a logic circuit coupled to each present state register of, and time shared between, the plurality of pixels, the logic circuit operable to:
compute a next state value of each pixel based on the present state value of the respective pixel when the charge collected by the one or more capacitors exceeds a threshold value; and
save the next state value of each pixel in the present state registers of the respective pixel.

2. The focal plan array of claim 1, wherein each pixel further comprises a portion of the logic circuit.

3. The focal plane array of claim 1, further comprising:
a selection circuit operable to select each pixel in succession, wherein the present state value of the selected pixel is provided to the logic circuit for computation of the next state value of the selected pixel.

4. The focal plane array of claim 1, wherein each pixel further comprises:
a plurality of tri-state drivers, each tri-state driver coupled to a bit of a plurality of bits of the present state register of the respective pixel; and
wherein the tri-state drivers of the plurality of pixels are collectively operable to provide a present state value of a selected pixel to the logic circuit.

5. The focal plane array of claim 1, wherein the logic circuit is operable to calculate each next state value by linearly incrementing or decrementing the present state value of the respective pixel.

6. The focal plane array of claim 1, further comprising:
a snapshot register selection circuit operable to select each snapshot register of a plurality of snapshot registers in succession, each snapshot register coupled to the present state register of a respective pixel and configured to copy the present state value of the respective pixel when selected by the snapshot register selection circuit.

7. A method comprising:
collecting, by each pixel of a plurality of pixels of a focal plane array, charge corresponding to an amount of light received at the respective pixel;
storing, in an present state register of each pixel, a present state value that indicates an amount of charge collected by the one or more capacitors of the pixel; and
computing, by a same logic circuit time shared among the pixels and coupled to each present state register, a next state value for each pixel of the plurality of pixels when the charge collected by each respective pixel exceeds a threshold amount; and saving the next state value for each pixel to the respective present state register of each pixel.

8. The method of claim 7, wherein each pixel comprises a portion of the logic circuit.

9. The method of claim 7, further comprising:
generating a selection signal configured to select each pixel in succession;
providing the present state value of the selected pixel to the logic circuit; and
computing of the next state value of the selected pixel.

10. The method of claim 7, further comprising:
providing, by a plurality of tri-state drivers, a present state value of a selected pixel to the logic circuit, the tri-state drivers coupled to a plurality of bits of the present state register of the selected pixel.

11. The method of claim 7, the computing the next state value of each pixel further comprising:
computing the next state value by linearly incrementing or decrementing the present state value of the respective pixel.

12. The method of claim 7, further comprising:
successively selecting, by a snapshot register selection circuit, each snapshot register of a plurality of snapshot registers, each snapshot register coupled to the present state register of a respective pixel; and
copying, by the selected snapshot register, the present state value of the respective pixel in response to being selected by the snapshot register selection circuit.

13. An apparatus comprising:
a plurality of array elements each comprising a present state register, each present state register operable to store a set of bits that represents a present state value of the respective array element, the present state value indicating an amount of charge collected by one or more capacitors within the respective array element;

a logic circuit coupled to each present state register of the apparatus, the logic circuit operable to perform the following for each array element:
calculate a next state value for the respective array element when the charge collected by the one or more capacitors exceeds a threshold value, the next state value based on the present state value of the respective array element; and
provide the next state value to the present state register of the respective array element; and
wherein the logic circuit is physically distributed among each of the array elements.

14. The apparatus of claim 13, wherein each array element time shares the logic circuit with the other array elements.

15. The apparatus of claim 13, further comprising:
a selection circuit operable to select each array element in succession, such that the present state value of the selected array element is provided to the logic circuit for computation of the next state value of the present state register of the selected array element.

16. The apparatus of claim 13, each array element further comprising:
a plurality of tri-state drivers, each tri-state driver coupled to a bit of a plurality of bits of the present state register of the respective array element; and
wherein the tri-state drivers of the plurality of array elements are collectively operable to provide a present state value of a selected array element to the logic circuit.

17. The apparatus of claim 13, wherein each present state register has a bit width that is equivalent to a bit width of the logic circuit.

18. The apparatus of claim 13, further comprising:
a snapshot register selection circuit operable to select each snapshot register of a plurality of snapshot registers in succession, each snapshot register coupled to the present state register of a respective array element and configured to copy the present state value of the array element when selected by the snapshot register selection circuit.

* * * * *